Nov. 14, 1939.   S. E. MORRAL ET AL   2,179,579
CORN HUSKING MACHINE
Filed Jan. 16, 1936   2 Sheets-Sheet 2
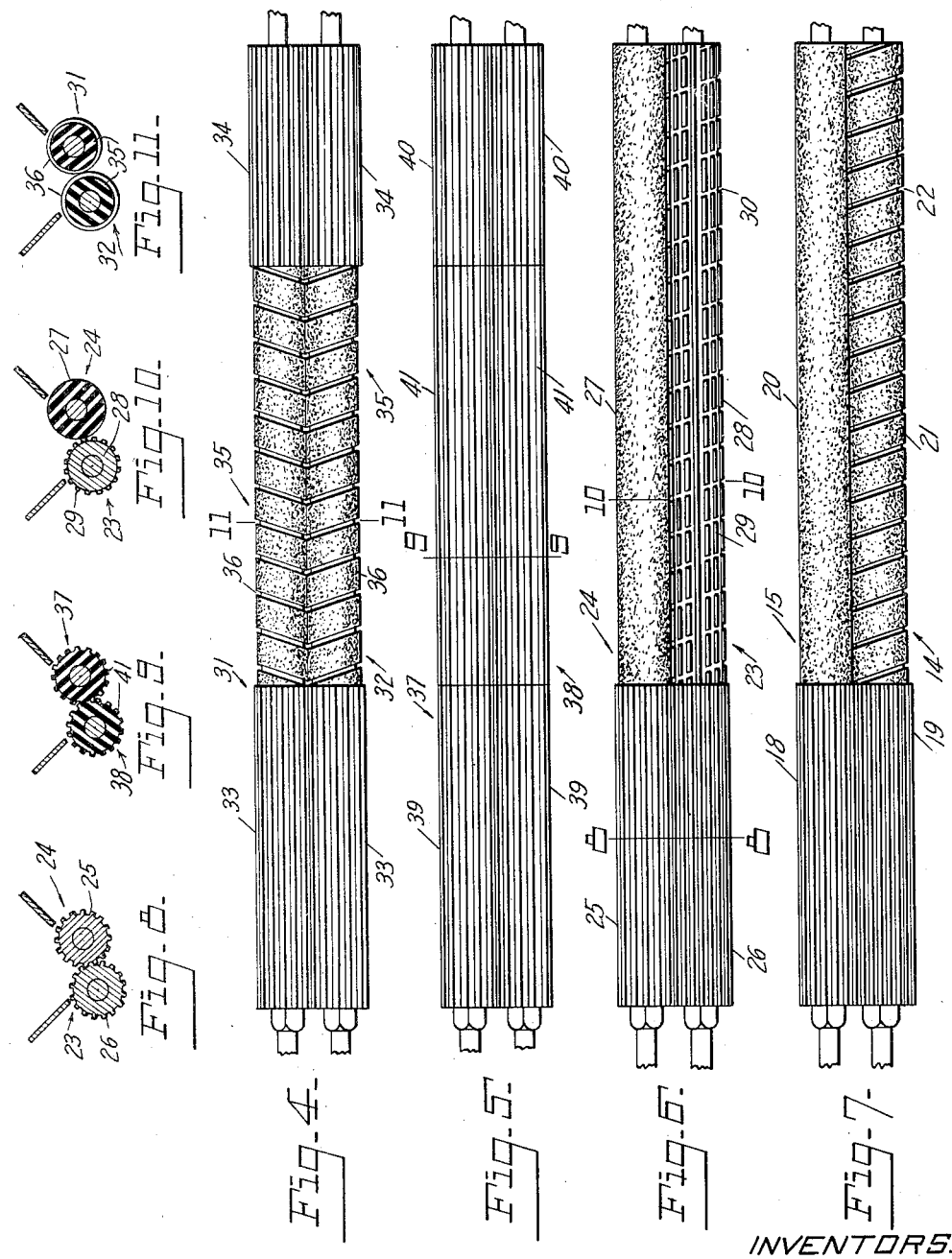
INVENTORS.
SAMUEL E. MORRAL.
WILLIAM W. MORRAL.
by
their ATTORNEY.

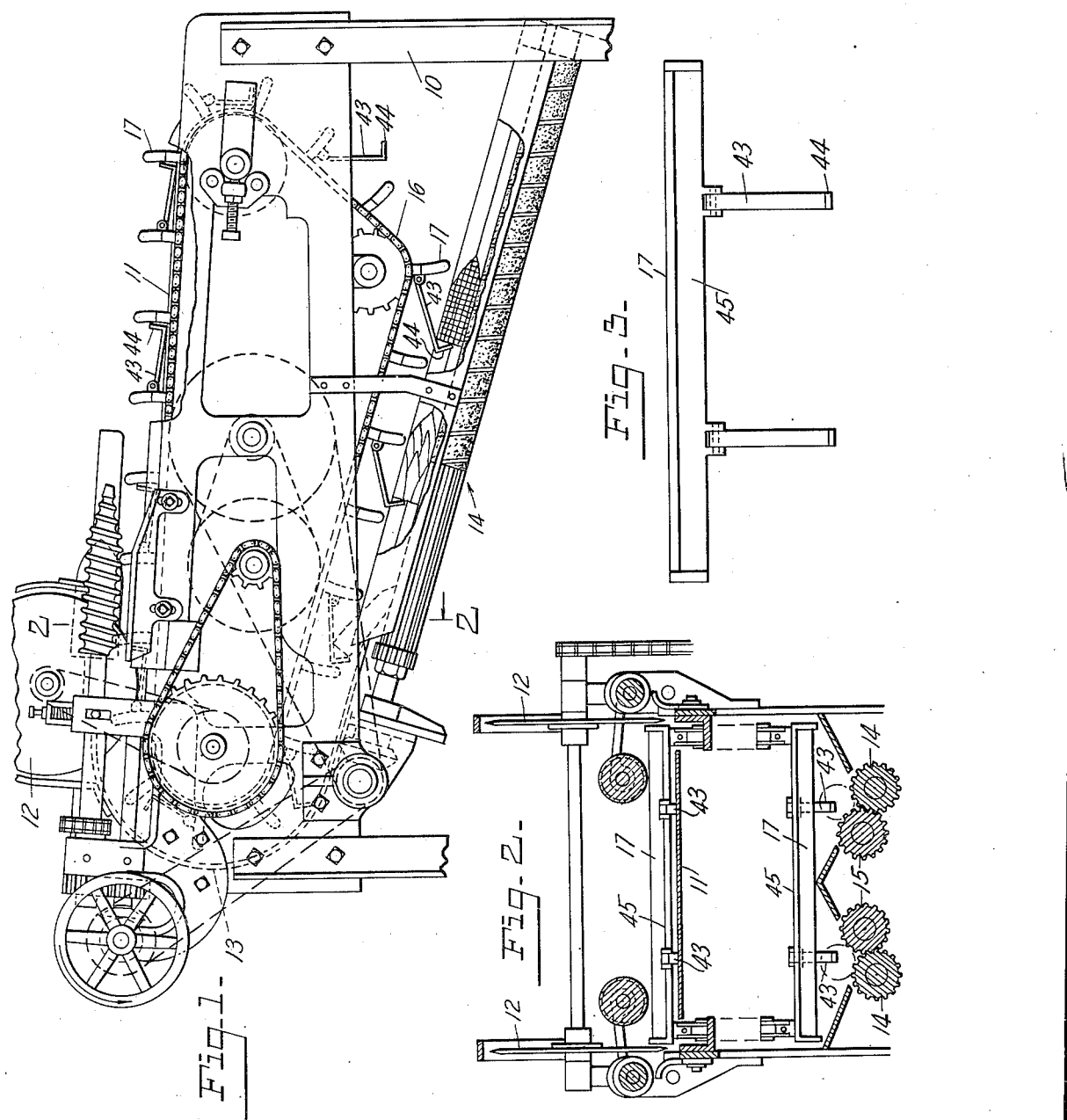

Patented Nov. 14, 1939

2,179,579

UNITED STATES PATENT OFFICE 2,179,579

CORN HUSKING MACHINE

Samuel E. Morral and William W. Morral, Morral, Ohio

Application January 16, 1936, Serial No. 59,383

11 Claims. (Cl. 130—5)

This invention relates to a corn husking machine and is a continuation in part of application Serial No. 547,078, filed by us on June 26, 1931.

One object of the invention is to provide a machine for husking green corn with husking rollers of such a character that a single pair of rollers will completely remove both the husks and the silk from an ear of corn which is moved over the rollers in the direction of their length.

A further object of the invention is to provide husking rollers of this kind which will adequately remove the husks and silk from ears of all kinds regardless of size and which will be of a wear resisting character at the points of greatest wear.

A further object of the invention is to provide such a machine with a conveyor having means for positively moving the ears along the husking rollers which will be of such a character that it will not interfere with the movement of the ears to the butt removing device.

Other objects of the invention will appear as the mechanism is described in detail.

In the accompanying drawings Fig. 1 is a side elevation, partly broken away, of a husking machine embodying our invention; Fig. 2 is a transverse sectional view taken on the line 2—2 of Fig. 1; Fig. 3 is a detail view of the ear engaging members and the means for mounting the same on the conveyor; Fig. 4 is a plan view of a pair of husking rollers embodying our invention; Fig. 5 is a similar view of a slightly modified form of husking rollers; Fig. 6 is a plan view of another form of husking rollers; Fig. 7 is a plan view of still another modification of husking rollers; Fig. 8 is a transverse sectional view taken on the line 8—8 of Fig. 6; Fig. 9 is a transverse sectional view taken on the line 9—9 of Fig. 5; Fig. 10 is a transverse sectional view taken on the line 10—10 of Fig. 6; and Fig. 11 is a transverse sectional view taken on the line 11—11 of Fig. 4.

In these drawings we have illustrated the invention as applied to a corn husking machine of a known type which comprises a main frame 10 having at its upper portion an approximately horizontal table 11 on each side and near one end of which are arranged butt removing devices 12. A chute 13 leads from the butt removing devices to husking rollers 14 and 15 arranged beneath the table 11, and here shown as inclined downwardly and rearwardly. An endless conveyor 16 has its upper stretch arranged to travel over the table 11 and move the ears of corn over the table to and past the butt removing devices and has its lower stretch extending above and lengthwise of the two pairs of husking rollers. The conveyor is provided with flights 17 to engage the ears and cause them to move with the conveyor but the lower stretch of the conveyor is spaced such a distance from the husking rollers that the flights cannot engage the ears which are on the rollers, this being necessary to permit the ears to turn to a lengthwise position on the husking rollers as they leave the chute.

The machine here illustrated is a double machine, that is, it has two butt removing devices 10 and a separate pair of husking rollers for each butt removing device, so that the machine will operate simultaneously on two rows of ears, but it will be obvious that the invention is not limited to a double machine but will operate equally well with a machine comprising a single butt removing device and a single pair of husking rollers.

For the removal of the husks from an ear of green corn it is desirable that the husking rollers should have hard roughened surfaces which will bite into and firmly grip the husks and pull the same from the ear and which will resist the severe wear to which the rollers are subjected. This type of roller, however, is not well adapted to the removal of the silk, a part at least of which will remain on the ear after the husks have been removed by the rollers. For removing the silk it is desirable that at least one of the rollers shall have a yieldable surface, as such a surface will better grip the silk and remove the same from the ear. In the present invention we have combined in a single pair of rollers cooperating surfaces of both kinds, so that when an ear is moved lengthwise of the husking rollers both the husks and silk will be removed and the ear delivered from the rollers completely husked and silked.

As shown in Figs. 1, 2 and 7 the husking rollers 14 and 15 are of substantially equal diameters and are arranged parallel and in contact one with the other, the inner roller 15 being mounted on an axis slightly higher than the axis of the roller 14, as this puts the weight of the ear on the lower roller and facilitates the rotation of the ear as it is being husked. At their ear receiving ends the two rollers are provided with cooperating portions 18 having hard surfaces, these being preferably of metal and being in the present instance roughened by providing them with intermeshing longitudinal ribs 19 which are well adapted to grip the husks and pull the same from the ears. The hard metal surfaces also impart to these portions of the rollers a wear resisting quality. These hard surfaced portions of the rollers extend for a portion of their length only and beyond the same the rollers are provided with surfaces of a different kind better adapted to grip and remove the silk. In this particular form of the invention at least one of the rollers is provided with a yieldable surface, which preferably consists of a cover of soft rubber, as shown at 20 and 21, which may, if desired, be slightly roughened, as by stippling it. Preferably the yieldable surface of at least one of the rollers is provided with a spiral groove to remove bits of cob or other hard material which may find their way into the bite of the rollers and thus prevent the injury of the yieldable surfaces thereby, and in the present arrangement the surface 21 of the roller 14 has such a groove, as shown at 22.

In the form shown in Fig. 6 both rollers, 23 and 24, are provided at their receiving ends with hard, roughened surfaces 25 having ribs 26, similar to those shown in Fig. 6. That portion of the roller 24 lying beyond the hard roughened surface 25 is provided with a yieldable surface and is preferably covered with rubber, as shown at 27, the rubber being slightly roughened, as by stippling. That portion 28 of roller 23 which is opposed to the yieldable surface of roller 24 has a hard surface, preferably of metal, and its surface is roughened, it being here shown as provided with longitudinal ribs 29, which will be pressed into the yieldable surface of roller 23 and firmly grip the silk between the two rollers. A spiral groove 30 intersects the ribs 29 and serves to remove bits of cob or the like from the bite of the rollers.

In both Figs. 6 and 7 the yieldable surfaced portions of the rollers extend from the hard surfaced ear receiving portions to the discharge ends of the rollers but this is not necessary and in some cases it is desirable that the rollers should be provided with hard surfaces adjacent to their discharge ends. Some ears which are difficult to husk, such as short ears or nubbins, will not always have the husks properly removed by the relatively short hard surfaced portions at the receiving ends of the rollers and such ears will often lodge at the discharge ends of the rollers and when the discharge portions of the rollers are of soft or yieldable material the lodged ear will clog the rollers and will subject the same to severe wear, and may cause the burning of the yieldable surface. To meet this situation we have shown in Figs. 4 and 5, a form of husking rollers in which each roller comprises three sections, both end portions having hard surfaces, and being preferably roughened, while the intermediate portions of at least one of the rollers is provided with a yieldable surface. With rollers of this type the ordinary ear will be husked and silked as it passes over the receiving and intermediate portions of the rollers, but if an ear, such as a nubbin, is not completely husked when it reaches the discharge portions of the rollers the hard surfaces of those portions will pinch off the husks and permit the ears to be discharged from the rollers without clogging or injuring the same. As shown in Fig. 4, the two rollers, 31 and 32, have at their receiving ends hard surfaced portions provided with longitudinal intermeshing ribs, as shown at 33, and are also provided with similar hard surfaced and ribbed portions 34 at the discharge ends thereof. In this particular construction both rollers are provided between the hard surfaced portions 33 and 34 with other portions having yieldable surfaces, as shown at 35, these portions being preferably covered with soft rubber. The yieldable surfaces may be slightly roughened, as by stippling, and both yieldable surfaces are here shown as provided with spiral grooves 36 which extend about the two rollers in opposite directions and are so arranged that they register one with the other at the bite of the rollers.

The rollers 37 and 38, shown in Fig. 5, have hard surfaced ribbed portions 39 and 40 at the respective ends thereof, similar to those shown in Fig. 4, and the intermediate portions are of yieldable material, but in this instance the yieldable surfaced portions are provided with intermeshing longitudinal ribs 41, which not only enable the same to better grip the silk but also have less tendency to become hard and glazed than do relatively smooth surfaces.

As shown in Fig. 1 the husking rollers are inclined so that the ears will tend to move lengthwise thereof by gravity but even in such an arrangement we have found it desirable to provide means for positively moving the ears along the husking rollers. As has been stated, the lower stretch of the conveyor is spaced from the husking rollers such a distance that the flights 17 thereof cannot engage the ears and any supplemental means that is provided on the conveyor for advancing the ears over the husking rollers must be of such a character that it will not interfere with the feeding of the ears to the butt removing device by the upper stretch of the conveyor. In the present construction we have pivotally mounted on the conveyor a plurality of ear engaging members or dogs 43, there being in the present instance two series of these members arranged to travel over the respective pairs of husking rollers of the double machine. The ear engaging members are shown in the form of elongate arms of a length approximately equal to the distance between adjacent flights and each such arm is pivotally mounted on the conveyor adjacent to and in the rear of one of the flights and has at its free end an angular or hook-shaped portion 44 adapted to engage the end of the ear. With this arrangement the ear engaging members will lie substantially parallel with the conveyor, with their angular ends close to the following flights, as the conveyor moves along the table 11 and through the chute 13 but as each ear engaging member enters the lower portion of the chute 13 it will move by gravity about its axis so that the hook-shaped end thereof will engage the rear end of the ear of corn lying in front thereof and will move that ear along the husking rollers. As the ear engaging member moves beyond the husking rollers and upwardly to the table 11 the ear engaging member will drop back to substantial parallelism with the conveyor, so that it will not interfere with the feeding of the ears to the butt removing device. These ear engaging members may be pivotally mounted on the conveyor in any suitable manner but, in the present instance, each pair of such members is carried by a cross bar 45 which is secured at its ends to the side chains of the conveyor and extends transversely thereto just in the rear of one of the flights 17. Any suitable number of ear engaging members may be used but it is essential that they should be spaced far enough apart to permit the ears to turn to longitudinal position as they pass onto the husking rollers and, in the present instance, an ear engaging member is provided adjacent to every other flight 17.

While we have shown and described one embodiment of our invention, together with various modifications of the husking rollers, we wish it to be understood that we do not wish to be limited to the details thereof as various modifications may occur to a person skilled in the art.

Having now fully described our invention, what we claim as new and desire to secure by Letters Patent, is:

1. Husking mechanism for green corn comprising a pair of husking rollers having at the ear receiving ends thereof hard surfaced portions provided with intermeshing ribs, having beyond said hard surfaced portions other portions having roughened yieldable surfaces provided with cooperating spiral grooves, and having beyond said yieldable surfaces other hard surfaced portions provided with intermeshing ribs.

2. Husking mechanism for green corn comprising a pair of husking rollers having at the ear receiving ends thereof hard surfaced portions provided with intermeshing ribs, having beyond said hard surfaced portions other portions surfaced with yieldable rubber and provided with intermeshing ribs, and having beyond said rubber surfaced portions other hard surfaced portions provided with intermeshing ribs.

3. Mechanism for husking green corn comprising a pair of husking rollers provided at the ear receiving ends thereof with portions having hard roughened surfaces cooperating to grip the husk and remove the same from the ear, said husk removing portions being of a length less than the length of said rollers, said rollers being provided at their discharge ends with other cooperating portions having hard surfaces and spaced a substantial distance from said husk removing portions, and said rollers also being provided with other portions arranged in and substantially filling the spaces between the hard surfaced portions of the respective rollers and having yieldable surfaces cooperating to remove the silks from the ears.

4. Mechanism for husking green corn comprising a pair of husking rollers having at the ear receiving ends thereof husking portions of substantial length provided with hard rough surfaces extending entirely about the same and cooperating to grip the husks and remove the same from the ear, said rollers having beyond said hard surfaced portions other portions cooperating to remove the silks from said ear, said silk removing portions having yieldable surfaces extending entirely about the same and provided with intermeshing ribs.

5. Mechanism for husking green corn comprising a pair of husking rollers having at the ear receiving ends thereof cooperating portions of substantial length provided with hard roughened surfaces extending entirely about the same, said rollers having at their discharge ends other cooperating hard surfaced portions of a length less than the length of the first mentioned portions and spaced from said first mentioned portions, each of said rollers also having an intermediate portion provided with a yieldable surface and arranged in and substantially filling the space between the hard surfaced end portions thereof and at least one of said yieldable surfaces being roughened.

6. Mechanism for husking green corn comprising a pair of husking rollers having at the ear receiving ends thereof cooperating portions having hard surfaces extending entirely about the same and provided with intermeshing longitudinal ribs, said portions being of a length less than the length of the rollers, said rollers also having beyond said hard surfaces other cooperating portions at least one of which is provided with a yieldable surface, the last mentioned portions being of a diameter less than the diameter of said hard surfaced portions, said rollers being provided at their discharge ends with cooperating hard surfaced portions.

7. Mechanism for husking green corn comprising a pair of husking rollers having near both ends thereof cooperating portions provided with hard surfaces and having intermeshing ribs, said hard surfaced portions of each roller having their adjacent ends spaced a substantial distance one from the other, said rollers also having cooperating portions arranged in and substantially filling the spaces between hard surfaced portions of the respective rollers and provided with opposed yieldable surfaces extending for the full length thereof, the last mentioned portions being of a diameter less than the diameter of said hard surfaced portions.

8. Mechanism for husking green corn comprising a pair of husking rollers having at the ear receiving ends thereof cooperating portions having hard surfaces extending entirely about the same and provided with intermeshing longitudinal ribs, said portions being of a length less than the length of the rollers and said rollers having beyond said hard surfaces other cooperating portions at least one of which is provided with a yieldable surface extending entirely about the same and the other of which is provided with a roughened surface extending entirely about the same.

9. Mechanism for husking green corn comprising a pair of husking rollers having near both ends thereof cooperating portions provided with hard surfaces and having intermeshing ribs, said hard surfaced portions of each roller having their adjacent ends spaced a substantial distance one from the other, said rollers also having cooperating portions arranged in and substantially filling the spaces between hard surfaced portions of the respective rollers and provided with opposed yieldable surfaces extending for the full length thereof.

10. Mechanism for husking green corn comprising a pair of husking rollers having near both ends thereof cooperating portions provided with hard surfaces and having intermeshing ribs, said hard surfaced portions of each roller having their adjacent ends spaced a substantial distance one from the other, said rollers also having other cooperating portions arranged in and substantially filling the spaces between the hard surfaced portions of the respective rollers and provided with opposed yieldable surfaces extending entirely about the same and for the full length thereof and having intermeshing ribs.

11. Mechanism for husking green corn comprising a pair of husking rollers having at the ear receiving ends thereof cooperating portions having hard surfaces extending entirely about the same and provided with intermeshing longitudinal ribs, said portions being of a length less than the length of the rollers, said rollers also having beyond said hard surfaces other cooperating portions at least one of which is provided with a yieldable surface, the last mentioned portions being of a diameter less than the diameter of said hard surfaced portions.

SAMUEL E. MORRAL.
WILLIAM W. MORRAL.